(12) United States Patent
Kuikka

(10) Patent No.: US 11,334,411 B2
(45) Date of Patent: May 17, 2022

(54) FUNCTIONAL SAFETY SOFTWARE CONCEPT FOR MOTOR DRIVES

(71) Applicant: ABB Schweiz AG, Baden (CH)

(72) Inventor: Toni Kuikka, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/951,399

(22) Filed: Nov. 18, 2020

(65) Prior Publication Data
US 2021/0149758 A1    May 20, 2021

(30) Foreign Application Priority Data
Nov. 18, 2019   (EP) .................................. 19209677

(51) Int. Cl.
*G06F 11/07*   (2006.01)
*G06F 11/30*   (2006.01)
*H04L 9/32*    (2006.01)

(52) U.S. Cl.
CPC ........ *G06F 11/0757* (2013.01); *G06F 11/302* (2013.01); *H04L 9/3242* (2013.01); *H04L 2209/38* (2013.01)

(58) Field of Classification Search
CPC .. G06F 11/0757; G06F 11/30; G06F 11/0793; H04L 9/3242
See application file for complete search history.

(56) References Cited

U.S. PATENT DOCUMENTS

| | | | |
|---|---|---|---|
| 2006/0072251 A1* | 4/2006 | Ross | G05B 9/02 361/1 |
| 2012/0110388 A1* | 5/2012 | Lavery | G06F 11/0721 714/47.1 |
| 2015/0268133 A1* | 9/2015 | Ranjan | G06F 11/2205 702/183 |

FOREIGN PATENT DOCUMENTS

WO    2016138401 A1    9/2016

OTHER PUBLICATIONS

European Patent Office, Extended Search Report issued in corresponding Application No. 19209677.4, dated Jul. 17, 2020, 8 pp.

* cited by examiner

*Primary Examiner* — Nadeem Iqbal
(74) *Attorney, Agent, or Firm* — Leydig, Voit & Mayer, Ltd.

(57) ABSTRACT

According to an aspect, there is provided a functional safety, FS, watch-dog timer circuit for a computing device of a frequency converter controlling a motor. The FS watchdog timer circuit is configured to trigger a safe state of the frequency converter in response to a timer of the FS watchdog timer circuit expiring. Moreover, the FS watchdog timer circuit is configured to reset the time in response to receiving a first refresh signal from the computing device funning FS software using non-inverted logic as well as in response to receiving a second refresh signal from the computing device running the FS software using inverted logic.

22 Claims, 8 Drawing Sheets

FUNCTIONAL SAFETY SOFTWARE CONCEPT FOR MOTOR DRIVES

TECHNICAL FIELD

Various example embodiments relates to control of industrial processes.

BACKGROUND

Drives are used to control the motion of machines, typically to achieve optimal performance and efficiency from the given machine or machines. Drives are employed in many applications that require precise motion control, for example, in line automation applications employing lifts, cranes and/or conveyor belts. To minimize risks associated with operating drive-driven industrial systems, various safety standards have been defined. Functional safety (FS) systems and devices which safely monitor and, when necessary, override the machine applications to ensure safe operation. Conventionally, functional safety is implemented using a separate functional safety certified processor. In other words, in a typical drive architecture, one processor is provided for carrying out non-FS-related functions and another for performing FS-related functions. In some alternative solutions, only the functional safety certified processor is provided so that both the FS- and non-FS-related functions are carried out by the same FS certified processor. However, in such solutions the need for certification serves as a bottleneck for the non-FS-related functionalities.

Therefore, there is a need for a simpler way for implementing functional safety so as to overcome or alleviate at least some of the aforementioned problems.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide apparatuses, methods, systems and computer readable media for implementing a functional safety concept.

BRIEF DESCRIPTION OF DRAWINGS

In the following, example embodiments will be described in greater detail with reference to the attached drawings, in which.

DETAILED DESCRIPTION OF SOME EMBODIMENTS

Figure 1A:
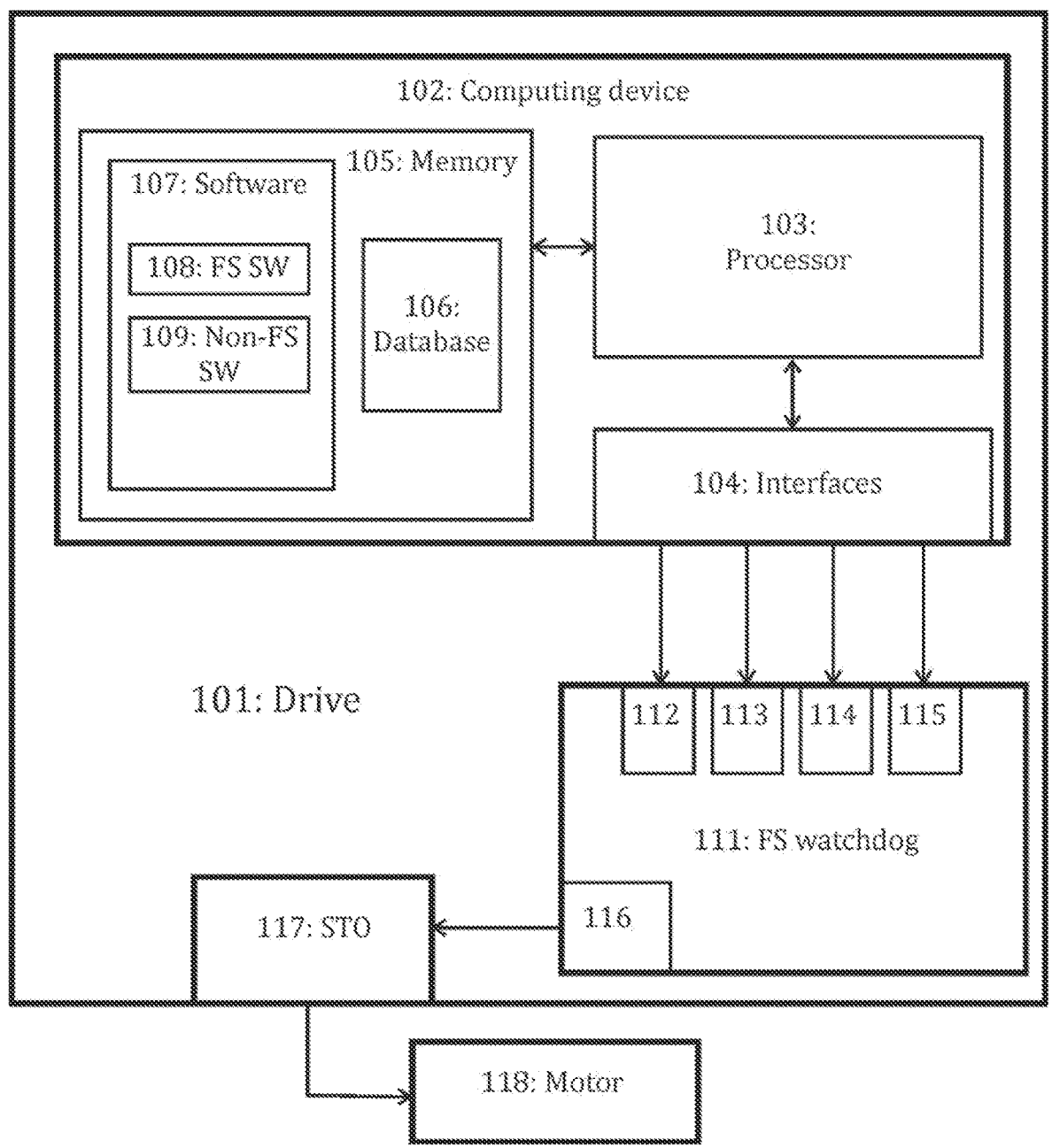
FIGS. 1A and 1B illustrate exemplary industrial systems according to embodiments.

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Safety standards define safety as freedom from unacceptable risk. The most effective way to eliminate risks is to design them away. But as risk reduction by design is not always possible or practical, safeguarding with static guards are often the next best option, and for several reasons. Stopping a machine quickly and safely, not only reduces risk but also increases machine uptime and productivity compared with abrupt safety stops. At the same time, the legal obligations are met and the safety of people and the environment is ensured. Functional safety (FS) in machinery usually means systems that safely monitor and, when necessary, override the machine applications to ensure safe operation. A safety-related system thus implements the required safety functions by detecting hazardous conditions and bringing operation to a safe state, by ensuring that a desired action, e.g. safe stopping, takes place. A safety function may be defined as a function of a machine whose failure can result in an immediate increase in risk. Safety system monitoring can include machine speed, direction of rotation, stopping and standstill. When executing a safety function, e.g., monitoring a crawl speed that deviates from the expected value (i.e. is too fast), the safety system detects this deviation and actively returns machine operation to a safe state by, for example, stopping the machine safely and removing the torque from the motor shaft. Any failure in the safety system will immediately increase risks related to machine operation.

Conventionally, functional safety is implemented using a separate functional safety certified processor. In other words, in a typical drive (or frequency converter) architecture, one processor (or central processing unit, CPU) is provided for carrying out non-FS-related functions and another, FS certifier processor (or CPU) for performing FS-related functions. These processors may be implemented on different printed circuit boards (PCBs) or on the same PCB. In some alternative solutions, only the functional safety certified processor is provided so that both the FS- and non-FS-related functions are carried out by the same certified processor. However, in such solutions the need for certification for the processor serves as a bottleneck for the non-FS-related functionalities as, for example, embedded operating system also needs to be certified.

The embodiments to be discussed serve to overcome or at least alleviate at least some of the problems with the current schemes for implementing functional safety in a drive or frequency converter.

Figure 1B:
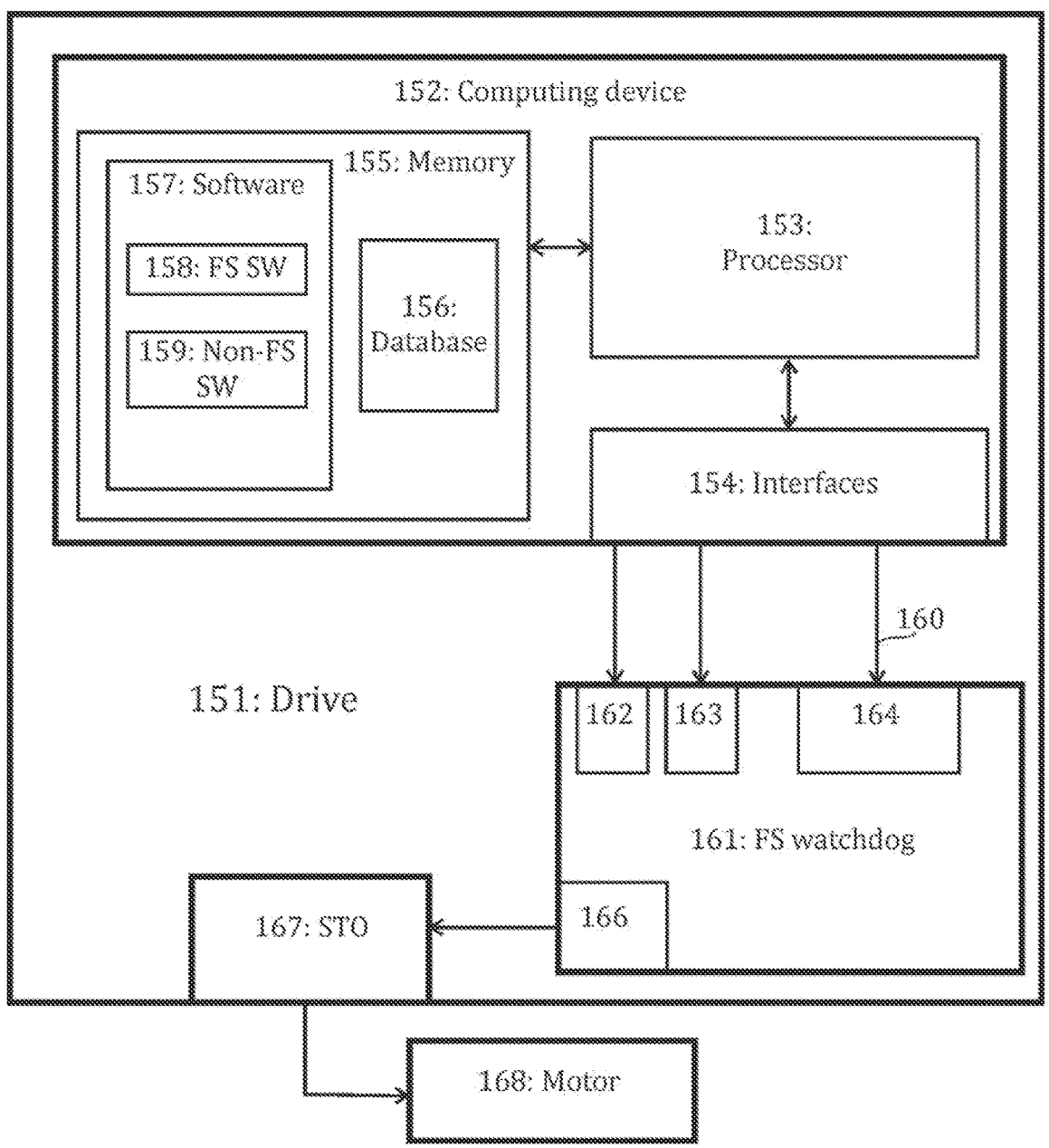

Two alternative architectures of systems to which embodiments of the invention may be applied are illustrated in FIGS. 1A and 1B. FIGS. 1A and 1B illustrates simplified system architecture only showing some elements and functional entities (namely, showing only some functional safety related elements and functional entities), all being logical units whose implementation may differ from what is shown. The connections shown in FIGS. 1A and 1B are logical connections; the actual physical connections may be different. It is apparent to a person skilled in the art that the system may also comprise other functions and structures.

Figure 2A:
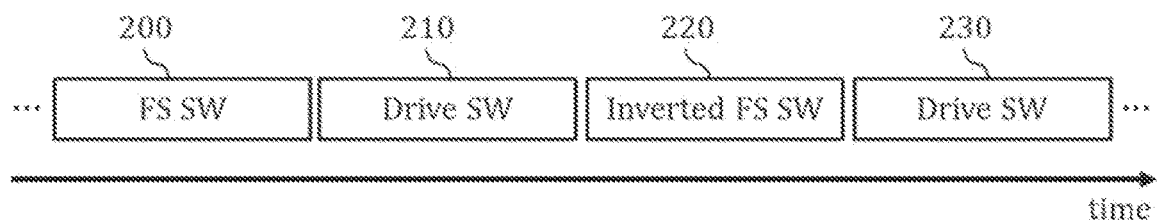
FIGS. 2A, 2B, 2C and 3 to 7 illustrate processes according to embodiments.
Figure 2B:
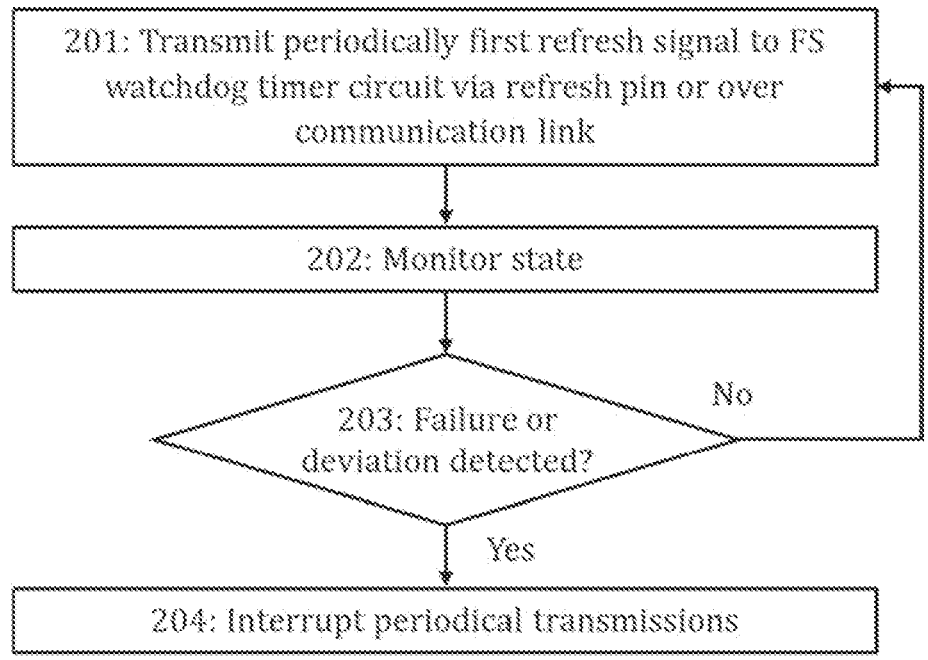

In the following, FIG. 1A is, first, discussed in detail and thereafter FIG. 2B is discussed with an emphasis on the differences compared to FIG. 1A. Unless otherwise stated, the definitions provided in relation to FIG. 1A apply as such also for the system of FIG. 1B.

FIG. 1A illustrates a system comprising a drive 101 controlling a motor 118. The drive 101 (equally called a motor drive) comprises at least a computing device 102, a functional safety (FS) watchdog timer circuit 111 and a safe torque off (STO) safety function 117. The motor 118 may be further connected to a mechanical system so that the drive 101, the motor 118 and the mechanical system form together an industrial system (e.g., a production or assembly line system or a part thereof).

The drive 101 is a device used for controlling the motion of the motor 118. Said control may be achieved by changing one or more drive parameters of the drive 101 which may comprise parameters such as torque, speed, power, voltage, frequency, motor control mode (e.g., scalar, vector or direct torque control), proportional-integral-derivative (PID) controller settings, acceleration ramp settings, deceleration ramp settings and/or other parameters affecting the operation of the drive. The drive 101 may specifically be an electrical drive (an AC drive supporting low to high voltages and/or low to high motor speeds). The drive 101 may be equally called a frequency converter. The drive 101 may be a programmable logic controller (PLC) or a (motor) soft starter. In an embodiment, the drive 101 may be a variable speed drive (VSD) or a variable frequency drive (VFD). Contrary to some definitions of term "drive", the motor 118 which is driven by the drive 101 does not form a part of the drive 101 itself in the context of this application (as is also shown in FIG. 1).

The drive 101 may comprise at least one high-voltage power unit (not shown in FIG. 1) for powering the motor 118 and a low-voltage control unit (comprising at least the elements 102, 111, 117) for providing control signalling to the power unit so as to control the drive 119 and enable safety functionalities. In some embodiments, the control and power units may be integrated into a single unit.

The drive 101 may be connected using a (wired) connection to the motor 118 driving industrial or non-industrial processes (i.e., driving a machine, a device, a component, an apparatus or a system for performing an industrial or non-industrial process). The drive 100 (or specifically its at least one power unit) may feed the motor 118 via a three-phase power supply. The motor 118 may be, for example, an asynchronous motor (e.g., an induction motor), a synchronous motor (e.g., a permanent magnet motor) or a reluctance motor (e.g., a synchronous reluctance motor). The motor may be used for running, for example, a system for transporting material, such as a pump, a fan, a compressor, a blower, a conveyor belt, a crane and/or an elevator and/or a system for processing materials, such as a paper machine, a mill, a stirrer and/or a centrifuge. While FIG. 1 illustrates a single motor 118, in other embodiments the drive 100 may be used for controlling an electrical machine comprising multiple motors.

The computing device 102 comprises a processor 103, interfaces 104 and a memory 105. The processor 103 may be a central processing unit (CPU) of the drive 101 or specifically a "normal", non-FS-certified central processing unit (CPU) of the drive 101. In some embodiments, one or more control circuitry such as one or more processors may be provided in the computing device 102, instead of a singular processor 103. According to embodiments, the computing device 102 may comprise one or more control circuitry 103, such as at least one processor, and at least one memory 105, including one or more algorithms 107, such as a computer program code (software) 108, 109 wherein the at least one memory and the computer program code (software) 108, 109 are configured, with the at least one processor, to cause the computing device to carry out any one of the exemplified functionalities of the computing device to be described below. It is also feasible to use specific integrated circuits, such as ASIC (Application Specific Integrated Circuit) or other components and devices for implementing the functionalities in accordance with different embodiments.

The memory 105 of the computing device 102 may be implemented using any suitable data storage technology, such as semiconductor based memory devices, flash memory, magnetic memory devices and systems, optical memory devices and systems, fixed memory and removable memory. The memory 105 comprises at least one database 106 and software 107 (i.e., one or more algorithms). The software 107 may specifically comprise functional safety (FS) software 109 and non-FS drive operational software 109. The non-FS drive operational software 109 may be equally called non-FS frequency converter operational software 109. The processor 103 may be configured to run at least the FS software 108 using both non-inverted logic and inverted logic. In some embodiments, some or all of the software 107 may have been compiled using a FS certified compiler.

The non-FS drive operational software 109 may be used for performing the non-FS-related functions of the drive 101. Said non-FS-related functions of the drive 101 comprise at least functions for controlling motion of a motor (or specifically, an electric motor) connected electrically to the drive (e.g., by adjusting one or more drive parameters of the drive 101 so as to adjust the motion of the motor 118). The non-FS drive operational software 109 may be run (e.g., using normal, non-inverted logic) periodically, for example, between the running of the FS software 108 using non-inverted logic and the running of the FS software 108 using inverse logic.

The interfaces 104 of the computing device 102 may comprise, for example, one or more communication interfaces comprising hardware and/or software for realizing communication connectivity according to one or more communication protocols. Specifically, the one or more communication interfaces 104 may comprise, for example, an interface providing a connection to a STO control pin 112 of the FS watchdog timer circuit 111, an interface providing a connection to an inverted STO control pin 113 of the FS watchdog timer circuit 111, an interface providing a connection to a refresh pin 114 of the FS watchdog timer circuit 111, an interface providing a connection to an inverted refresh pin 115 of the FS watchdog timer circuit 111. The interfaces providing connections to the refresh pin 114 and the STO control pin 112 may be controlled by the FS software 108 when run using non-inverted logic while the interfaces providing connections to the inverted refresh pin 115 and the inverted STO control pin 113 may be controlled by the FS software 109 when run using inverted logic. The one or more communication interfaces 104 may comprise standard well-known components such as an amplifier, filter, frequency-converter, (de)modulator, and encoder/decoder circuitries, controlled by the corresponding controlling units, and one or more antennas. The one or more communication interfaces 104 may also comprise a user interface.

The FS watchdog timer circuit 111 is a hardware watchdog timer used for functional safety purposes. According to a general definition, a watchdog timer (sometimes called a computer operating properly or COP timer, or simply a watchdog) is an electronic timer that is used to detect and recover from computer malfunctions. Typically, the FS watchdog timer has pre-defined starting value from which it counts down until zero or another predefined value is reached. During normal operation of a computing device watched by the watchdog timer, the computing device periodically resets the watchdog timer (i.e., resets the watchdog timer to the pre-defined starting value) to prevent it from expiring or timing out. The act of restarting a watchdog timer is commonly referred to as "kicking" the watchdog. If, due to a hardware fault or program error, the computing device fails to reset the watchdog, the timer will expire (i.e., reach zero or another pre-defined value) and generate a timeout signal. The timeout signal is used to initiate corrective action or actions.

The FS watchdog timer circuit 111 according to embodiments provides the functionalities described in the previous paragraph with the computing device 102 being the computing device watched by the FS watchdog timer circuit 111 and the timeout signal corresponding to a signal for triggering a safe state of the drive, i.e., here specifically triggering the STO safety function 117. However, in order to ensure that all failures will be detected, the FS watchdog timer circuit 111 is configured to receive periodically two different refresh signals for resetting a timer: a first refresh signal received via the refresh pin 114 and generated using the FS software 108 run using non-inverted logic and a second refresh signal received via the inverted refresh pin 115 and generated using the FS software 109 run using the inverted logic. The first and second refresh signals may be associated with the same timer.

As mentioned above, the FS watchdog timer circuit 111 may comprise, in addition to the refresh pin 114 and the inverted refresh pin 115 for resetting the timer(s), a STO control pin 112 and an inverted STO control pin 113 for receiving STO control data and inverted STO control data from the computing device 102, respectively. Further, at least one pin or output 116 may be provided for triggering (or controlling) the STO safety function 117.

In some embodiments, the FS watchdog timer circuit 111 is a windowed watchdog. A windowed watchdog is triggered not only if a timer expires, but also if a timer is reset more often than is expected. In other words, the windowed watchdog detects not only if a timer overflows but also if it underflows.

In some embodiments, the FS watchdog timer circuit 111 is an application-specific integrated circuit (ASIC) or a field-programmable gate array (FPGA).

The STO safety function 117 is a basic foundation for drive-based functional safety used for bringing a drive safely to a no-torque state. The STO safety function 117 may be used for preventing an unexpected startup of the motor 118 and/or for stopping the motor 118 (e.g., due to overheat or overspeed protection purposes or as an emergency stop of the motor 118). Specifically, said emergency stop fulfils the stop category 0. The stop category 0 means stopping by immediate removal of power to the machine actuators (i.e., an uncontrolled stop—stopping of machine motion by removing electrical power to the machine actuators). The stopping of the motor 118 may be achieved by shutting down a power unit of the drive 101 in a (pre-defined) controlled manner.

In some embodiments, the drive 101 may comprise (or be connected to), in addition to the STO safety function 117, one or more other safety functions (not shown in FIG. 1). Said one or more other safety functions may comprise, for example, one or more of a safe stop 1 (SS1), a safe stop emergency (SSE), a safely-limited speed (SLS), a safe maximum speed (SMS) and a safe brake control (SBC). At least some of said one or more other safety functions may also be controlled (or triggered) by the computing device 102 using FS software 108 (e.g., upon receiving a corresponding user input).

While the FS watchdog timer circuit 111 and the STO safety function 117 (and one or more other safety functions) may be integral parts of the drive 101 (as illustrated in FIG. 1A), in other embodiments, one or more of elements 11, 117 may form a separate system or systems (external to the drive 101).

As mentioned above, FIG. 1B illustrates an alternative embodiment to the embodiment illustrated in FIG. 1A. The system illustrated in FIG. 1B comprises, similar to the system of FIG. 1A, a drive 151 controlling a motor 168. The drive 151 comprises at least a computing device 152, a functional safety (FS) watchdog timer circuit 161 and a STO safety function 167. The elements 156, 160, 167, 168 of FIG. 1B may correspond fully to elements 106, 110, 117, 118 of FIG. 1A as described above.

The system of FIG. 1B differs from the system of FIG. 1A in that the connection between the computing device 102 and the FS watchdog timer circuit 111 achieved in FIG. 1A using the refresh pin 114 and the inverted refresh pin 115 is replaced in FIG. 1B with a single communication link 160 between the computing device 152 and the FS watchdog timer circuit 161. The communication link 160 may be a wired or wireless communication link. The communication link 160 may implement communication connectivity according to one or more communication protocols. Specifically, the communication link 160 may employ at least one serial communication protocol. For example, the communication link 160 may employ at least one of an Inter-integrated-circuit (I2C) protocol, a Serial Peripheral Interface (SPI) protocol and a Universal Asynchronous Reception and Transmission (UART) protocol. Each of the computing device 152 and the FS watchdog timer circuit 161 may comprise a corresponding communication interface 154, 164 providing said communication link 160. Said communication interfaces providing the communication link 160 may comprise standard well-known components such as an amplifier, filter, frequency-converter, (de)modulator, and encoder/decoder circuitries, controlled by the corresponding controlling units, and one or more antennas. Apart from this change concerning transmission means, the interfaces 154 of the computing device 152 and the pins 162, 163, 166 of the FS watchdog timer circuit 161 may correspond fully to the interfaces 104 of the computing device 102 and the pins 112, 113, 116 of the FS watchdog timer circuit 111, as described in relation to FIG. 1A.

The communication link 160 may be used for transmitting information such as time-varying code from the computing device 152 to the FS watchdog timer circuit 161. The FS watchdog timer circuit 161 may be configured to validating the state of the computing device (or specifically the state of the FS software) based on said time-varying code. The FS watchdog timer circuit 161 may, thus, be considered a more advanced form of the FS watchdog timer circuit 111 of FIG. 1A, capable of processing the more complex information received from the computing device 152. Consequently, the processor 153 and the FS software 158 of FIG. 1B may also be configured or defined differently compared to the corresponding elements 103, 108 of the system of FIG. 1A, as will be discussed below in more detail.

In some embodiments, the FS watchdog timer circuit 161 is an application-specific integrated circuit (ASIC) or a field-programmable gate array (FPGA).

While FIGS. 1A and 1B show only a single safety logic (namely, FS watchdog timer circuit 111, 161) and only a single safety function (namely, a STO safety function 117, 167), it should be understood that the drives 101, 151 may comprise also one or more other safety logics and one or more other safety functions.

Figure 2C:
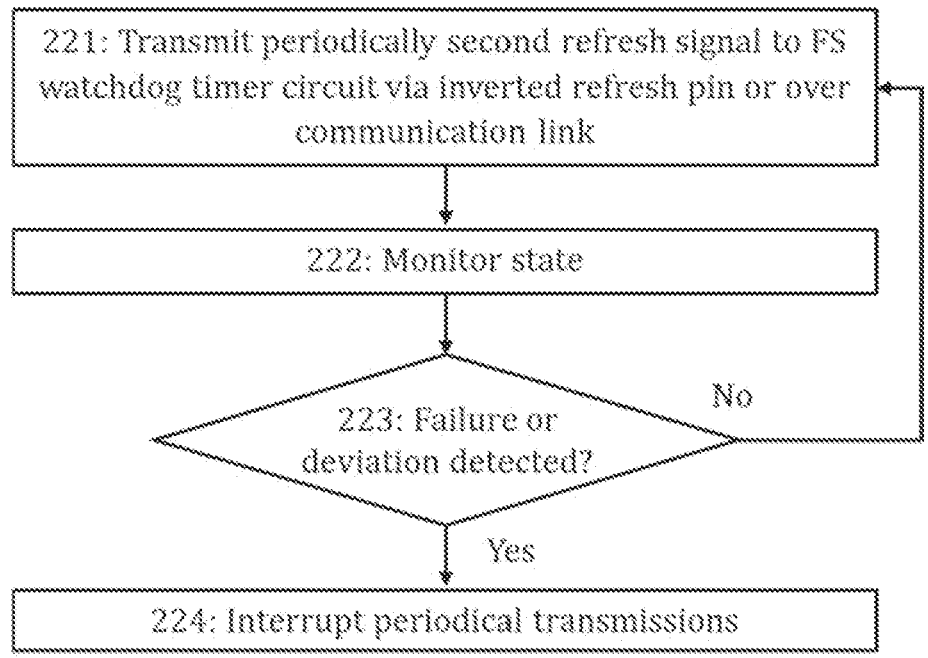

FIGS. 2A, 2B and 2C illustrate processes according to embodiments for operating a computing device of a drive so as to enable triggering of a safe state of the drive using a FS watchdog timer circuit. The computing device in question may be the computing device 102 of FIG. 1A or the computing device 152 of FIG. 1B.

FIG. 2A illustrates the (processor) scheduling of the computing device during operation according to embodiments. Specifically, FIG. 2A illustrates four consecutive time slots 100, 110, 120, 130 which are scheduled, respectively, for running FS software 100, running non-FS drive operational software 110, running inverted FS software 120 (i.e., running FS software using inverted logic) and running (again) non-FS drive operation software 130. The scheduling illustrated in FIG. 2A may repeat so that following running of non-FS drive operation software 230, the FS software may be run again using non-inverted logic. Therefore, non-FS drive operational software 210 is run (e.g., using non-inverted logic) between the running of the FS software 108 using non-inverted logic 200 and the running of the FS software 108 using inverse logic 220 according to the illustrated embodiment. Each of the FS software and the non-FS drive operation software may be run periodically so that every other instance of running the FS software employs inverted logic.

As mentioned above, the non-FS drive operational software 210, 230 may be used for performing the non-FS-related functions of the drive. Said non-FS-related functions of the drive 101 may comprise at least controlling motion of an electric motor connected electrically to the drive (e.g., by adjusting one or more drive parameters of the drive). The functions of the FS software when ran using non-inverted 200 and inverted logic 220 are described in detail in relation to FIGS. 2B and 2C.

While the length of the each block 200, 210, 220, 230 is the same in FIG. 2A, in some embodiments the duration associated with said blocks 200, 210, 220, 230 may be different. Specifically, blocks 200, 210, 220, 230 may correspond, respectively, to a first predefined amount of time, a second pre-defined amount of time, a third pre-defined amount of time and a fourth first pre-defined amount of time. In some embodiments, said first and third pre-defined amounts of time may be equal and/or said second and fourth pre-defined amounts of time may be equal.

It should be noted that in other embodiments, the non-FS drive operation software 210, 230 may not be always run between two consecutive instances of running the FS software (using either non-inverted or inverted logic). Other differences in the scheduling may also exist compared to the simple example illustrated in FIG. 2A. According to a general definition, the FS software may be run using non-inverted logic and using inverted logic periodically but at different times.

Figure 4:
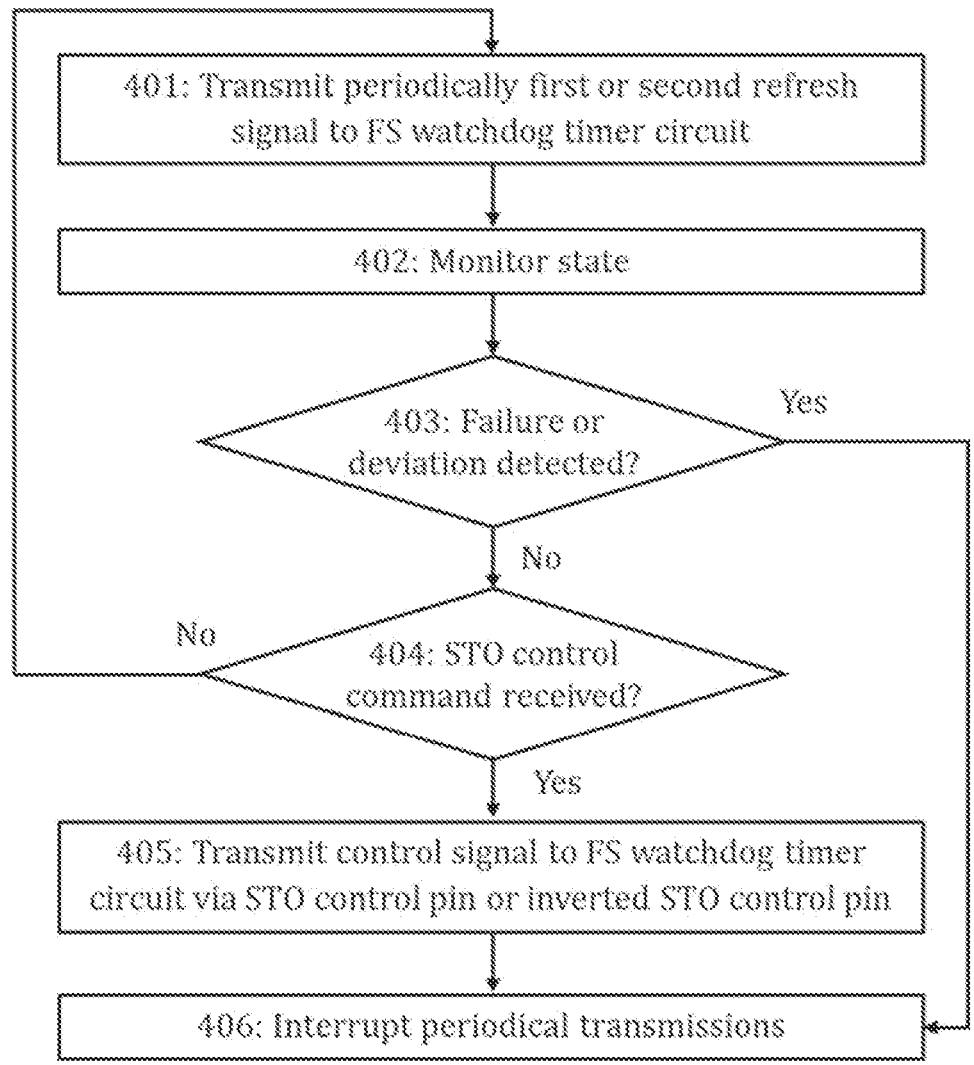
Figure 6:
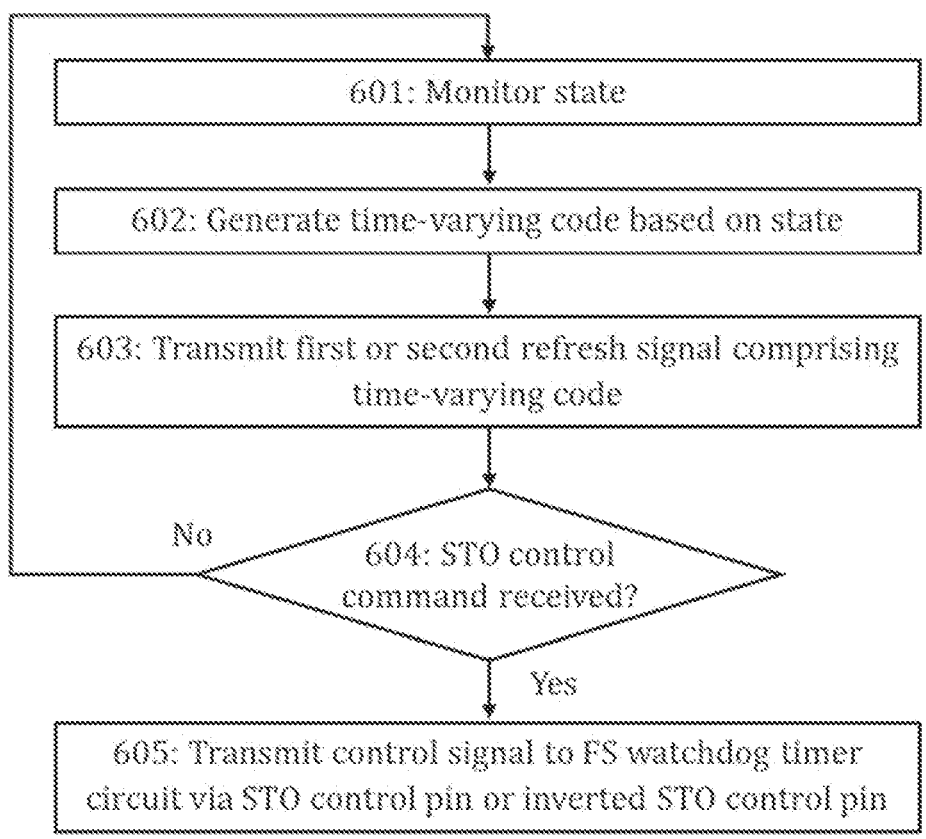

It should be noted that the scheduling as discussed in relation to FIG. 2A may be applied not only in connection with the processes of FIGS. 2B and 2C, but also in connection with any of the processes of the computing device of the drive according to further embodiments (e.g., FIGS. 4 and 6).

FIGS. 2B and 2C illustrate the operation of the computing device when running the FS software using non-inverted and inverted logic, respectively. In other words, the process of FIG. 2B corresponds to block 200 of FIG. 2A and the process of FIG. 2C corresponds to block 220 of FIG. 2A.

Referring to FIG. 2B, the computing device transmits, in block 201, periodically a first refresh signal to a FS watchdog timer circuit. Specifically, the first refresh signal is transmitted either via a refresh pin of the FS watchdog timer circuit (in the case of the system of FIG. 1A) or via a communication link (in the case of the system of FIG. 1B). The first refresh signal may be a simple signal carrying no information, e.g., an alternating current (AC) signal or a square-wave signal having a particular frequency or at least being in a certain frequency range. Alternatively, the first refresh signal may be a more complicated signal carrying information such as time-varying code. The latter option may be specifically employed with the system of FIG. 1B. The computing device monitors, in block 202, a state of the computing device. Specifically, the computing device may monitor, in block 202, a state of the FS software indicative of the (FS) state of the computing device. The monitoring in block 202 may comprise monitoring validity of relevant data in a random access memory (which may be, here, data specific to running the FS software using non-inverted logic) and/or validity of relevant data in one or more permanent memories. The information on the current state derived in block 202 may be stored to a memory of the computing device. In response to detecting (or encountering) a failure or a deviation from normal operation during the monitoring in block 203, the computing device interrupts, in block 204, the periodical transmitting of the first refresh signal (i.e., the transmitting according to block 201). Consequently, the timer of the FS watchdog timer circuit will expire causing triggering of the safe state of the drive (e.g., by triggering the STO safety function) and consequently causing stopping the motor in a controlled and safe manner.

FIG. 2C illustrating the operation of the computing device when running the FS software inverted logic corresponds for the most part to the process of FIG. 2B. Apart from the fact that inverted logic is employed, the only difference between the two processes is that, in FIG. 2C, computing device transmits, in block 221, a second refresh signal to the FS watchdog timer circuit. Specifically, the second refresh signal may be transmitted via an inverted refresh pin of the FS watchdog timer circuit (in the case of the system of FIG. 1A) or via the communication link (in the case of the system of FIG. 1B). In the latter case, the same communication link may be employed for both processes of FIGS. 1B and 1C. Similar to the first refresh signal, the second refresh signal may be a simple signal containing no information or a more complicated signal comprising information such as time-varying code. Correspondingly, the computing device interrupts, in block 224, the periodical transmitting of the second refresh signal (i.e., the transmitting according to block 221).

Blocks 222, 223 may correspond to blocks 202, 203, apart from the fact that inverted logic is employed. Correspondingly, the monitoring of the state of the computing device (or of the FS software) in block 222 may comprise monitoring validity of relevant data in a random access memory (which may be, here, data specific to running the FS software using inverted logic) and/or validity of relevant data in one or more permanent memories.

In some embodiments, the computing device may interrupt running of the FS software altogether in blocks 204, 224. In general, the computing device may interrupt, in blocks 204, 224, any periodical transmissions (including both blocks 201, 221) and/or all monitoring activity (i.e., actions according to 202, 203, 222, 223).

In some embodiments, the computing device may store, in a random access memory (RAM), separate data for the FS software when run using non-inverted logic and for the FS software when run using inverted logic. In latter case, the data in the RAM may be inverted. Said RAM data associated with non-inverted and inverted logic may be used, for example, in the monitoring in blocks 202, 222, respectively.

Figure 3:
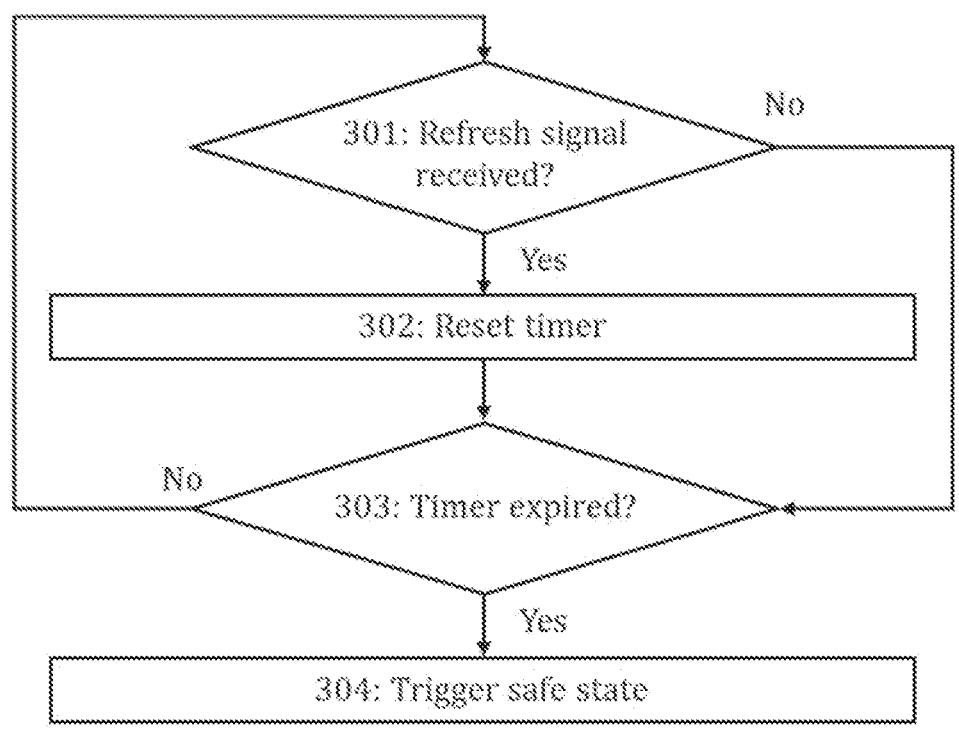

FIG. 3 illustrates the basic functionality of a FS watchdog timer circuit watching a computing device (or a processor or a CPU) of a drive for triggering a safe state of the drive (e.g., by triggering the STO safety function of the drive) according to embodiments. The process of FIG. 3 may be carried out by the FS watchdog timer circuit 111 of FIG. 1A or by the FS watchdog timer circuit 161 of FIG. 1B. The process of FIG. 3 performed by the FS watchdog timer circuit may correspond actions carried out in response to performing the processes of FIGS. 2A, 2B and 2C by a computing device of a drive.

Referring to FIG. 3, it is assumed that a timer of the FS watchdog timer circuit has been initiated at some earlier point in time (e.g., in response to receiving a first or second refresh signal as described below) and consequently a timer of the FS watchdog timer circuit is constantly counting down. In response to receiving a refresh signal from a computing device running the FS software in block 301, the FS watchdog timer circuit resets, in block 302, the timer of the FS watchdog timer circuit. In other words, the timer is set again to a predefined starting value in block 302. The refresh signal received in block 301 may be a first refresh signal received from the computing device running the FS software using non-inverted logic via a refresh pin of the FS watchdog timer circuit or a second refresh signal received from the computing device running the FS software using inverted logic via an inverted refresh pin of the FS watchdog timer circuit. In other embodiments, the refresh signal received in block 301 may be a first refresh signal received from the computing device running the FS software using non-inverted logic over a communication link or a second refresh signal received from the computing device running the FS software using inverted logic over said communication link.

In response to the timer of the FS watchdog timer circuit expiring (i.e., reaching zero or other pre-defined value) in block 303, the FS watchdog timer circuit triggers, in block 304, a safe state of the drive (or specifically a STO safety function of the drive). The triggering may specifically comprise transmitting a triggering STO control signal to the STO safety function via a corresponding output of the FS watchdog timer circuit.

In embodiments where the FS watchdog timer circuit is a windowed watchdog, two different checks may be carried out in block 303. Namely, in addition to the functionality described in the previous paragraph (i.e., checking whether the timer has expired), it is determined whether the period between consecutive resets (i.e., the last two consecutive resets) of the timer is below a pre-defined lower threshold. If this is true, the windowed FS watchdog timer circuit triggers, in block 304, a safe state of the drive. This second check may be carried out every time the timer is reset in block 302. To enable this functionality, the windowed FS watchdog timer circuit may be configured to store information on the time of the reset of the timer in block 302 to a memory.

Figure 5:
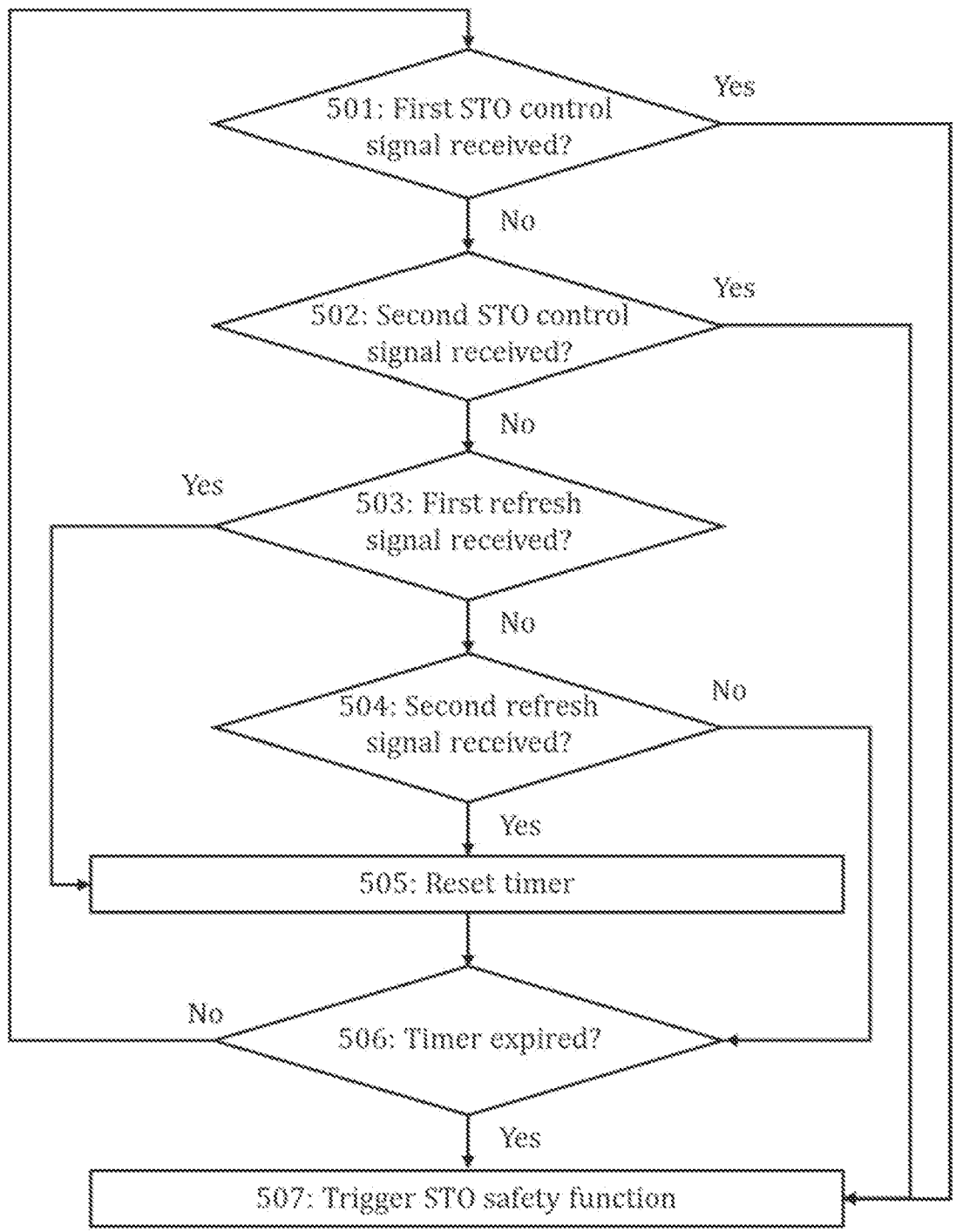

FIGS. 4 and 5 illustrate, respectively, further functionalities of the computing device (e.g., a CPU) of the drive and the FS watchdog timer circuit watching the computing device for triggering a safe state of the drive (e.g., by triggering the STO safety function of the drive) according to embodiments. The process of FIG. 4 may be carried out by the computing device 102 of FIG. 1A or the computing device 152 of FIG. 1B while the process of FIG. 5 may be carried out by the FS watchdog timer circuit 111 of FIG. 1A or by the FS watchdog timer circuit 161 of FIG. 1B. The processes of FIGS. 4 and 5 may be performed in parallel by said two devices.

The process of FIG. 4 may correspond to a process carried out by the computing device of the drive running FS software using non-inverted or inverted logic. The computing device transmits, in block 401, periodically a first refresh signal (if non-inverted logic is used) or a second refresh signal (if inverted logic is used) to a FS watchdog timer circuit. As in above embodiments, the first refresh signal may be transmitted to the FS watchdog timer circuit either via a refresh pin of the FS watchdog timer circuit (in the case of the system of FIG. 1A) or via a communication link (in the case of the system of FIG. 1B). Also similar to above embodiments, the computing device monitors, in block 402, a state of the computing device (or specifically, a state of the FS software) and in response to detecting a failure or a deviation during the monitoring in block 403, the computing device interrupts, in block 406, the periodical transmitting of the first or second refresh signal (i.e., the transmitting according to block 401).

However, in the process of FIG. 4, the FS watchdog timer circuit may also be controlled in a more direct way. In response to receiving a STO control command in block 404, the computing device transmits, in block 405, a STO control signal to the FS watchdog timer circuit to a STO control pin of the FS watchdog timer circuit, if non-inverted logic is used, or to an inverted STO control pin of the FS watchdog timer circuit, if inverted logic is used. The STO control command may be received by the computing device, for example, via a user input device of the drive (e.g., a drive control panel). In other words, the user of the drive may be able to manually control (at least to trigger) the STO safety function via the user input device of the drive.

In FIG. 4, it is assumed that the STO control signal corresponds to a control signal for triggering the STO safety function (i.e., for stopping the motor controlled by the drive in a controlled way). Thus, after the transmitting of the STO control signal in block 405, the periodical transmissions of first and/or second refresh signal are also interrupted according to block 406.

As mentioned above, FIG. 5 may correspond to a process carried out by the FS watchdog timer circuit while the computing device carries out a process according to FIG. 4. In response receiving a first STO control signal for triggering the STO safety function from the computing device via a STO control pin of the FS watchdog timer circuit (associated with the FS software ran using non-inverted logic) in block 501, the FS watchdog timer circuit triggers, in block 507, the STO safety function of the drive. Similarly, in response to receiving a second STO control signal for triggering the STO safety function from the computing device via an inverted STO control pin of the FS watchdog timer circuit (associated with the FS software ran using inverted logic) in block 502, the FS watchdog timer circuit also triggers, in block 507, the FS safety function.

The elements 503 to 507 may correspond to elements 301 to 304 of FIG. 3 are thus not discussed here in detail. It should, however, be noted that, in FIG. 5, the receiving of the first and second refresh signals are illustrated with separate elements 503, 504 while in FIG. 4, a single element 301 was used for illustrating the same functionality.

Figure 7:
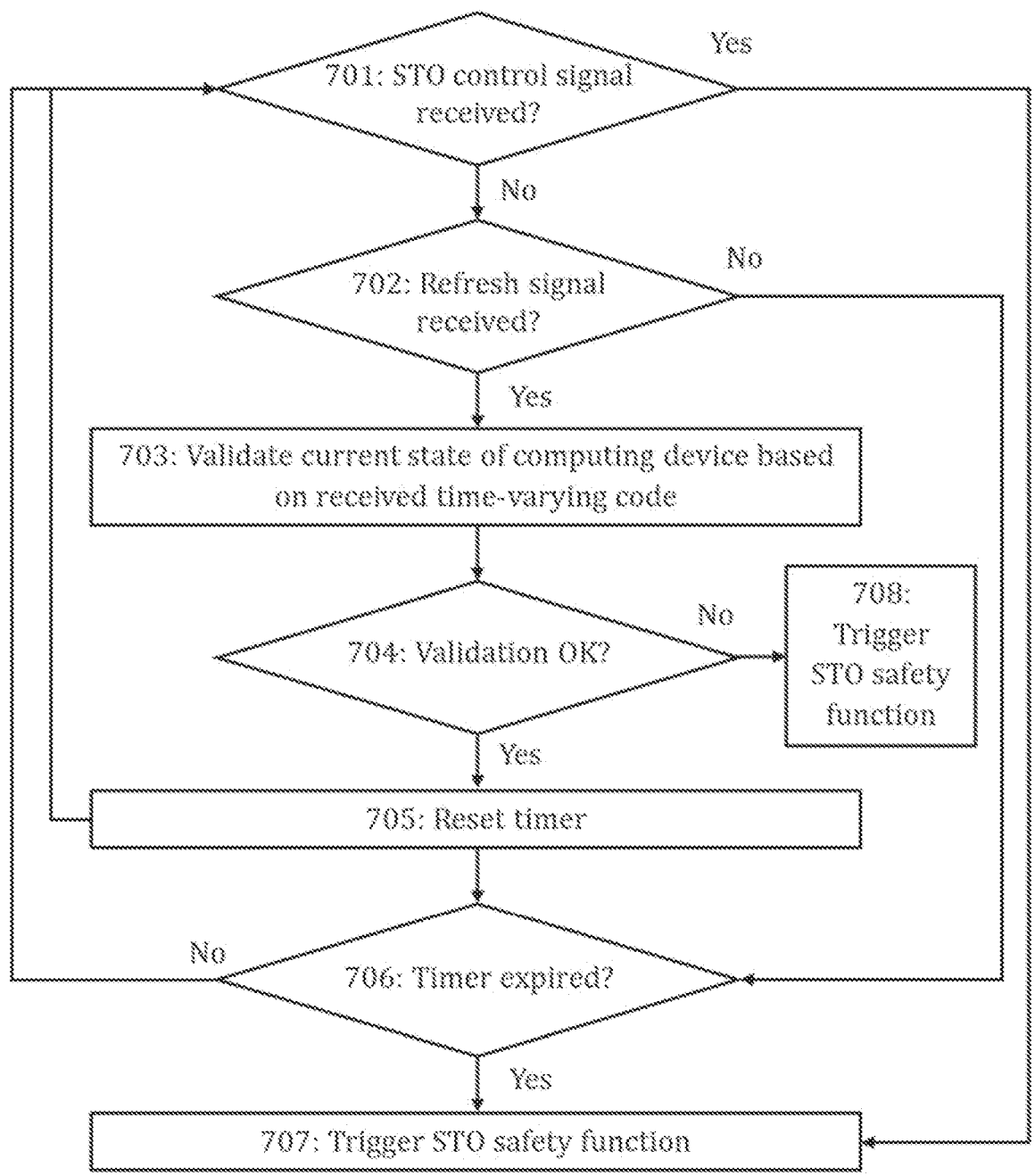

FIGS. 6 and 7 illustrate, respectively, processes of the computing device of the drive and the FS watchdog timer circuit watching the computing device for triggering a safe state of the drive (e.g., by triggering the STO safety function of the drive) according to a more advanced embodiment. The process of FIG. 4 may be carried out specifically by the computing device 152 of FIG. 1B while the process of FIG. 5 may be carried out by the FS watchdog timer circuit 161 of FIG. 1B. The processes of FIGS. 4 and 5 may be performed in parallel by said two devices. The scheduling of the computing device during operation according to these embodiments may be carried out as described above in relation to FIG. 2A.

Similar to the process of FIG. 4, the process of FIG. 6 may correspond to a process carried out by the computing device of the drive running FS software using non-inverted or using inverted logic.

Similar to above embodiments, the computing device monitors, in block 601, a state of the computing device. Specifically, the computing device may monitor, in block 601, a state of the FS software indicative of the (FS) state of the computing device. The information on the current state derived in block 601 may be stored to a memory of the computing device in a normal, non-inverted way and inverted way (depending on whether the computing device is currently operating using non-inverted or inverted logic).

Based on said monitoring, the computing device generates, in block 602, time-varying code (i.e., code defined to change over time). The time-varying code may be indicative of the state of the computing device (or of the FS software run in the computing device). The time-varying code may correspond to a blockchain and the generating in block 602 may comprise adding a block to a blockchain. Specifically, the generating in block 602 may comprise adding a previously calculated hash (i.e., a message digest) of a previous block in the blockchain and a timestamp or a message counter to the information on a current state of the computing device (or of the FS software) derived in block 601 and calculating a (second) hash over the resulting data. This second hash is to be included in the following block of the block chain when the process is repeated. For the first block in the blockchain, the process may be slightly different in that no hash may be included in said first block.

The computing device transmits, in block 603, a first refresh signal (if non-inverted logic is used) or a second refresh signal (if inverted logic is used) to a FS watchdog timer circuit over the communication link between the computing device and the FS watchdog timer circuit. Here, said first or second refresh signal comprises said time-varying code generated based on the state of the computing device (or of the FS software). The time-varying code may be used by the FS watchdog timer circuit to validate state of the computing device (or specifically by the FS software).

The transmitting in block 603 may be periodic (as evidenced by the loop formed by elements 601 to 604). The monitoring in block 601 and the generating in block 602 may be carried out periodically or continuously.

Blocks 604, 605 of FIG. 6 may correspond to blocks 404, 405 of FIG. 4 and are thus not repeated here for brevity. However, it should be emphasized that the transmitting of the STO control signal is carried out here also via a STO control pin or via an inverted STO control pin (depending on whether non-inverted or inverted logic is used), that is, not via the communication link. In some embodiments, blocks 604, 605 may be omitted (with block 603 leading directly back to block 601).

In some embodiments, the computing device may, in response to detecting (or encountering) a failure or a deviation during the monitoring in block 601, interrupt the periodical transmitting of the first and/or second refresh signal, similar to as discussed in relation to above embodiments. Said interrupting may be delayed (if possible) until a first or second refresh signal (depending on whether non-inverted or inverted logic is currently used, respectively) comprising time-varying code indicating said detected failure or deviation is transmitted over the communication link.

As described also for other embodiments, the computing device may also in these embodiments store, in a random access memory (RAM), separate data for the FS software when run using non-inverted logic and for the FS software when run using inverted logic.

Referring to FIG. 7, the STO control functionality illustrated with block 701 may correspond fully to functionality discussed in relation to blocks 501, 502 of FIG. 5 and is thus not repeated here for brevity. It should be noted that in some simple embodiments block 701 may be omitted (similar to, e.g., FIG. 3).

As was mentioned above, the FS watchdog timer circuit may conduct its own analysis of the state of the computing device based on information received from the computing device. Specifically, in response to receiving a first or second refresh signal comprising time-varying code over the communication link in block 702, the FS watchdog timer circuit validates, in block 703, the current state of the computing device (or specifically its FS software) based on the received (time-varying) code (i.e., the code comprised in said first or second refresh signal). As described above, the time-varying code may correspond, for example, to a blockchain. In such embodiments, the validating of the state of the computing device in block 703 may comprise determining whether or not the received blockchain is valid. This validity check may comprise, for example, verifying that all the hashes in the blockchain have been signed with the correct signing key.

In response to the validating being successful (i.e., indicating no failure or deviation from normal operation) in block 704, the FS watchdog timer circuit resets, in block 705, its timer (similar to as discussed, e.g., in relation to block 302 of FIG. 3). In response to the validating indicating a failure or a deviation in block 703, the FS watchdog timer circuit triggers, in block 708, the STO safety function of the drive. Blocks 706, 707 may correspond to blocks 303, 304 of FIG. 3 or blocks 506, 507 of FIG. 5 and are thus not discussed here in detail. Moreover, blocks 706, 707 may correspond to same actions (being drawn as separate entities merely clarity of presentation).

The embodiments discussed above provide several advantages over conventional solutions (such as the ones described in the beginning of the Detailed Description of Some Embodiments section). Said advantages include, for example, the following:

Due to the separation of FS software and inverted FS software, all failures will be detected. These failures may include, for example, bit flips, RAM and ROM data corruption due to problems with electromagnetic compatibility (EMC) or failed program logic.

No additional processor (or CPU) is needed for functional safety.

Any processor may be employed in the embodiments (as opposed to only FS certified processors).

Non-FS drive operational software and FS software may be considerably simpler compared to conventional solutions. Core logic of FS Software may be very small compared to communication stacks and accessories needed due to a separation of CPU and FS CPU according to conventional solutions.

Same software can be used for all future generations, since it is portable when compared to current solutions which are depended on used FS CPU.

Safety Integrity Level 3 (SIL3) can be reached.

The blocks, related functions, and information exchanges described above by means of FIGS. 2A, 2B, 2C, 3, 4, 5, 6 and 7 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used in this application, the terms 'circuitry' and 'circuit' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' and/or 'circuit' applies to all uses of this term in this application, including any claims.

As a further example, as used in this application, the term 'circuitry' or 'circuit' also covers an implementation of merely a hardware circuit or processor (or multiple processors) or a portion of a hardware circuit or processor and its (or their) accompanying software and/or firmware.

In an embodiment, at least some of the processes described in connection with FIGS. 2A, 2B, 2C, 3, 4, 5, 6 and 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, filter (low-pass, high-pass, bandpass and/or bandstop), sensor, circuitry, inverter, capacitor, inductor, resistor, operational amplifier, diode, transistor and antenna. In an embodiment, the at least one processor, the memory, and the computer program code form processing means or comprises one or more computer program code portions for carrying out one or more operations according to any one of the embodiments of FIGS. 2A, 2B, 2C, 3, 4, 5, 6 and 7 or operations thereof. In some embodiments, at least some of the processes may be implemented using discrete components.

Embodiments as described may also be carried out, fully or at least in part, in the form of a computer process defined by a computer program or portions thereof (e.g., by FS software and/or non-FS drive operational software). Embodiments of the methods described in connection with FIGS. 2A, 2B, 2C, 3, 4, 5, 6 and 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

The embodiments may be implemented, at least in part, in existing systems, such as in inverters and/or surveillance systems of drives, or discrete elements and devices may be used in a centralized or decentralized manner. Existing devices, such as inverters, typically comprise a processor and a memory which may be utilized in implementing the functionality of the embodiments. Thus, the changes and assemblies required by the implementation of the embodiments may, at least partly, be taken care of by software routines, which, in turn, may be implemented as added or updated software routines (being defined as described in the previous paragraph).

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A functional safety, FS, watchdog timer circuit for a computing device of a frequency converter controlling a motor, the FS watchdog timer circuit being configured to perform:
   triggering a safe state of the frequency converter in response to a timer of the FS watchdog timer circuit expiring;
   resetting the timer in response to receiving a first refresh signal from the computing device running FS software using non-inverted logic; and
   resetting the timer in response to receiving a second refresh signal from the computing device running the FS software using inverted logic.

2. The FS watchdog timer circuit according to claim 1, wherein the triggering of the safe state of the frequency converter comprises triggering a safe torque off, STO, safety function of the frequency converter, the FS watchdog timer circuit being further configured to perform:
   triggering the STO safety function of the frequency converter also in response to receiving a first STO control signal for triggering the STO safety function from the computing device running the FS software using non-inverted logic via a STO control pin of the FS watchdog timer circuit or a second STO control signal for triggering the STO safety function from the computing device running the FS software using inverted logic via an inverted STO control pin of the FS watchdog timer circuit.

3. The FS watchdog timer circuit according to claim 1, wherein the FS watchdog timer circuit is configured to receive the first refresh signal via a refresh pin of the FS watchdog timer circuit and to receive the second refresh signal via an inverted refresh pin of the FS watchdog timer circuit.

4. The FS watchdog timer circuit according to claim 1, wherein the FS watchdog timer circuit is configured to receive the first refresh signal and the second refresh signal over a communication link between the computing device and the FS watchdog timer circuit.

5. The FS watchdog timer circuit according to claim 4, wherein each of the first refresh signal and the second refresh signal comprises time-varying code, the time-varying code being indicative of a current state of the FS software running in the computing device of the frequency converter.

6. The FS watchdog timer circuit according to claim 5, wherein the FS watchdog timer circuit is further configured to perform in response to receiving either of the first refresh signal and the second refresh signal:
validating the current state of the FS software based on the received time-varying code;
in response to the validating indicating a failure or a deviation from normal operation, triggering the safe state of the frequency converter; and
in response to the validating not indicating a failure or a deviation from normal operation, performing the resetting of the timer of the FS watchdog timer circuit.

7. The FS watchdog timer circuit according to claim 5, wherein the time-varying code corresponds to a blockchain.

8. The FS watchdog timer circuit according to claim 1, wherein the triggering of the safe state of the frequency converter comprises triggering a safe torque off, STO, safety function of the frequency converter.

9. The FS watchdog timer circuit according to claim 1, wherein the FS watchdog timer circuit is a windowed watchdog timer circuit, the FS watchdog timer circuit being configured to perform:
triggering a safe state of the frequency converter in response to a period between consecutive resets of the timer being below a pre-defined lower threshold.

10. A computing device for a frequency converter comprising:
at least one processor; and
at least one memory including computer program code, wherein the computer program code comprises functional safety, FS, software and non-FS frequency converter operational software and the at least one memory and the FS software are configured, with the at least one processor using non-inverted logic, to cause the computing device at least to perform:
transmitting periodically a first refresh signal to a FS watchdog timer circuit;
monitoring a state of the FS software; and
interrupting the periodical transmitting of the first refresh signal in response to detecting a failure or a deviation during the monitoring,
wherein the at least one memory and the FS software configured, with the at least one processor using inverted logic, to cause the computing device at least to perform:
transmitting periodically a second refresh signal to the FS watchdog timer circuit;
monitoring the state of the FS software; and
interrupting the periodical transmitting of the second refresh signal in response to detecting a failure or a deviation during the monitoring.

11. The computing device according to claim 10, wherein the at least one memory and the FS software are configured, with the at least one processor using non-inverted logic, to cause the computing device to perform the periodical transmitting of the first refresh signal via a refresh pin of the FS watchdog timer circuit and the at least one memory and the FS software are configured, with the at least one processor using inverted logic, to cause the computing device to perform the periodical transmitting of the second refresh signal via an inverted refresh pin of the FS watchdog timer circuit.

12. A computing device for a frequency converter comprising:
at least one processor; and
at least one memory including computer program code, wherein the computer program code comprises functional safety, FS, software and non-FS frequency converter operational software and the at least one memory and the FS software are configured, with the at least one processor using non-inverted logic, to cause the computing device at least to perform:
monitoring a state of the FS software; and
transmitting periodically a first refresh signal to a FS watchdog timer circuit, wherein the first refresh signal comprises time-varying code generated based on the state of the FS software for validating the state of the FS software,
wherein the at least one memory and the FS software configured, with the at least one processor using inverted logic, to cause the computing device at least to perform:
monitoring the state of the FS software; and
transmitting periodically a second refresh signal to the FS watchdog timer circuit, wherein the second refresh signal comprises time-varying code generated based on the state of the FS software for validating the state of the FS software.

13. The computing device according to claim 12, wherein the at least one memory and the FS software are configured, with the at least one processor using non-inverted logic, to cause the computing device at least to perform the periodical transmitting of the first refresh signal over a communication link between the computing device and the FS watchdog timer circuit and the at least one memory and the FS software are configured, with the at least one processor using inverted logic, to cause the computing device at least to perform the periodical transmitting of the second refresh signal over said communication link.

14. The computing device according to claim 12, wherein the time-varying code corresponds to a blockchain.

15. The computing device according to claim 10, wherein the at least one memory and the computer program code are further configured to, with the at least one processor, cause the computing device to run the FS software using non-inverted logic and using inverted logic periodically but at different times.

16. The computing device according to claim 10, wherein the at least one memory and the computer program code are configured to, with the at least one processor, cause the computing device to run the non-FS frequency converter operational software between the running of the FS software with non-inverted logic and the running of the FS software with inverted logic, the at least one memory and the non-FS frequency converter operational software being configured, with the at least one processor, to cause the computing device at least to control motion of the motor connected electrically to the frequency converter.

17. The computing device according to claim 10, wherein the at least one memory and the computer program code are configured to, with the at least one processor, cause the computing device at least to perform:

storing, in a random access memory, separate data for the FS software when run using non-inverted logic and for the FS software when run using inverted logic, wherein any monitoring of the state of the FS software comprises monitoring validity of relevant data in the random access memory and/or monitoring validity of relevant data in one or more permanent memories.

18. The computing device according to claim 10, wherein the at least one memory and the FS software are configured, with the at least one processor using non-inverted logic, to cause the computing device to further perform:

controlling the STO safety function of the frequency converter by transmitting STO control signals to a STO control pin of the FS watchdog timer circuit, wherein the at least one memory and the FS software are configured, with the at least one processor using inverted logic, to cause the computing device to further perform:

controlling the STO safety function of the frequency converter by transmitting STO control signals to an inverted STO control pin of the FS watchdog timer circuit.

19. A non-transitory computer readable media having stored thereon instructions comprising functional safety, FS, software that, when executed by a computing device using non-inverted logic, cause the computing device to perform:

transmitting periodically a first refresh signal to a FS watchdog timer circuit;

monitoring a state of the FS software; and interrupting the periodical transmitting of the first refresh signal in response to detecting a failure or a deviation during the monitoring, wherein the instructions, when executed by the computing device using inverted logic, cause the computing device to further perform:

transmitting periodically a second refresh signal to the FS watchdog timer circuit;

monitoring the state of the FS software; and interrupting the periodical transmitting of the second refresh signal in response to detecting a failure or a deviation during the monitoring.

20. A non-transitory computer readable media having stored thereon instructions comprising functional safety, FS, software that, when executed by a computing device using non-inverted logic, cause the computing device to perform:

monitoring a state of the FS software; and transmitting periodically a first refresh signal to a FS watchdog timer circuit, wherein the first refresh signal comprises time-varying code generated based on the state of the FS software for validating the state of the FS software, wherein the instructions, when executed by the computing device using inverted logic, cause the computing device to further perform:

monitoring the state of the FS software; and transmitting periodically a second refresh signal to the FS watchdog timer circuit, wherein the second refresh signal comprises time-varying code generated based on the state of the FS software for validating the state of the FS software.

21. A frequency converter comprising:

a computing device according to claim 10; and functional safety, FS, watchdog timer circuit configured to perform:

triggering a safe state of the frequency converter in response to a timer of the FS watchdog timer circuit expiring;

resetting the timer in response to receiving a first refresh signal from a computing device running FS software using non-inverted logic, and resetting the timer in response to receiving a second refresh signal from the computing device running the FS software using inverted logic.

22. The frequency converter of claim 21, further comprising:

a safe torque off, STO, safety function controllable by the FS watchdog timer circuit.

* * * * *